United States Patent [19]
Turner

[11] 3,925,203
[45] Dec. 9, 1975

[54] SYSTEM FOR INTRODUCING FLOCCULATING IONS AND AIR INTO WASTE WATER TREATMENT SYSTEMS

[76] Inventor: Abner B. Turner, R.D. 3, Box 364, Greensburg, Pa. 15601

[22] Filed: Feb. 25, 1974

[21] Appl. No.: 445,502

[52] U.S. Cl. .................. 210/44; 210/63; 210/221; 204/149
[51] Int. Cl. .......................................... B01d 21/01
[58] Field of Search ....... 210/42, 44, 84, 63, 198 R, 210/220, 221; 204/149

[56] References Cited
UNITED STATES PATENTS

| | | | |
|---|---|---|---|
| 1,069,169 | 8/1913 | Parker | 210/44 X |
| 3,479,281 | 11/1969 | Kikindai et al. | 210/221 X |
| 3,642,618 | 2/1972 | Silva | 210/221 X |
| 3,663,413 | 5/1972 | Marmo | 210/221 X |
| 3,804,255 | 4/1974 | Speece | 212/221 X |

*Primary Examiner*—John Adee

[57] ABSTRACT

The recovery of suspended solids from different types of waste water is improved by locating an annular electrode assembly external to tank-like flotation cell used for effecting such solids removal. Air is introduced into water circulated from a cell-containing liquid being treated and is pumped under high pressure into a housing for the electrode. The water is retained in the housing for a time sufficient to permit the air to dissolve in the water and for flocculating ions to be added to the system as a result of electrolytic erosion of the electrode metal. The mixture of well-mixed waste water, dissolved air and metal flocculating ions are discharged through an expansion valve into a flocculating tank or cell containing the liquid. The air then comes out of solution in the form of minute bubbles and combines with the flocculating ions to carry suspended particles of solids to the surface. The floc thus produced is then skimmed or otherwise removed from the tank surface and transported to a disposal site.

2 Claims, 2 Drawing Figures

SYSTEM FOR INTRODUCING FLOCCULATING IONS AND AIR INTO WASTE WATER TREATMENT SYSTEMS

BACKGROUND OF THE INVENTION

To facilitate recovery or removal of suspended particles of solids from waste waters, flocculating ions and small air bubbles are introduced into flotation cells associated with waste water treatment tanks to effect separation of solids from the liquid. The function served by aluminum or other trivalent ions usually generated by an electrode in the cell, is to cause attraction of suspended solids particles to one another which then form a more concentrated mass of solids or floc having handability characteristics. The minute bubbles which usually are introduced into the bottom of a tank adhere to the floc thus imparting buoyancy to the floc mass which then rises to the liquid surface for removal by mechanical skimming equipment.

Present designs of the flotation waste water treatment systems utilize electrodes of iron or aluminum, for example, to produce both the flocculating ions and minute air bubbles thus eliminating the need for separate equipment or systems to provide either the bubbles or ions to the liquid being treated. It has been found that in those installations which incorporate the electrode in the flotation cell of a waste water treatment system for the above purposes, when current is supplied in a sufficient magnitude to produce an optimum quantity of bubbles for solids removal, too much of the consummable anode is eroded. When nonsacrificial electrodes such as platinum plated titanium are substituted for the consummable type, gas bubbles only are generated and no flocculating ions are produced to cause the particles of solids to adhere to one another to form the floc necessary to be carried to the surface by the air bubbles.

In addition to these disadvantages, it has been found that a white scale deposit, usually an oxide of the metal electrode, forms on the electrode surface and to remove this scale, current flow is reversed through the electrode thus using more electric power which does not contribute to performance of the system.

SUMMARY OF THE INVENTION

Briefly stated, to eliminate the above-cited disadvantages, the consummable electrode is located in a housing exterior of the flotation cell. Air is mixed with water drawn from the flotation cell and supplied to the housing under pressure. The air-water mixture is retained therein for a time sufficient for the metallic ions from the electrode to be deposited in the liquid, and for the air to be dissolved in the liquid. The solution is then discharged from the housing, reduced in pressure and supplied to a flotation cell wherein small bubbles are released from the liquid to carry floc to the cell surface, and simultaneously, the metallic ions concentrate floc into masses of a size to be buoyed to the surface by the rising bubbles.

An object of the invention therefore is to provide a waste water treatment system which supplies flocculating ions and air in the form of minute bubbles to a flotation cell for removing suspended solids from the cell liquid.

Another object of the invention is to provide a waste water treatment system which utilizes an electrode for providing flocculating ions to a flotation cell wherein the degree of consumption of the electrode can readily be determined by determining the resistance of the electrode material.

BRIEF DESCRIPTION OF THE DRAWINGS

The subject matter of this invention is particularly pointed out and distinctly claimed in the concluding portion of this specification. The invention however, both as to organization and method of operation, together with further objects and advantages thereof, may best be understood by reference to the following description taken in connection with the accompanying drawings, in which:

Figure 1:
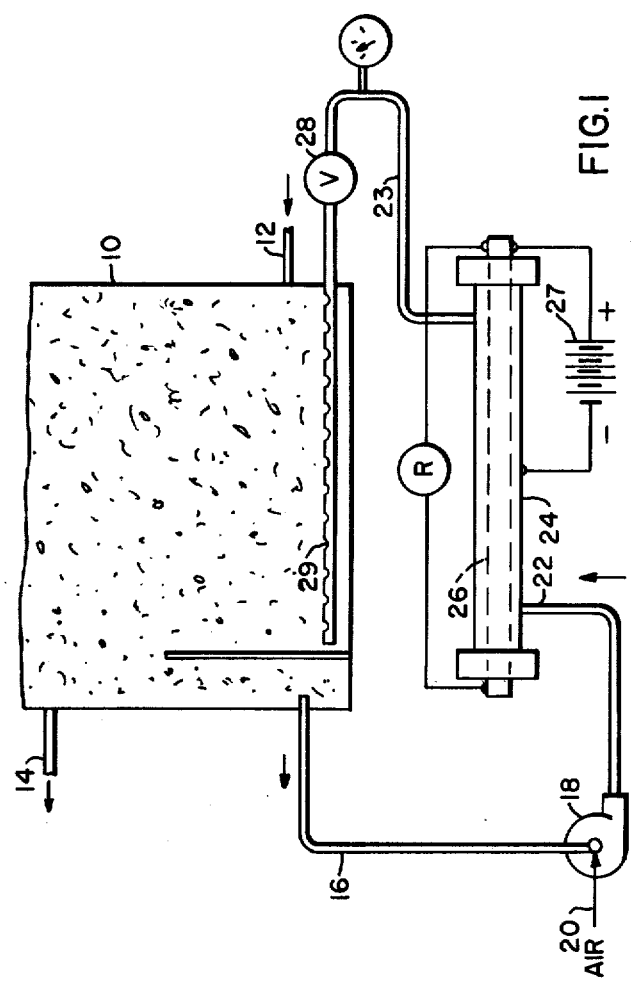
FIG. 1 is a schematic showing of the waste water treatment system used for providing flocculating ions and small air bubbles to a flotation cell for separating suspended solids therein.

Referring now to the drawings wherein like reference characters designate like or corresponding parts throughout the several views, there is shown in FIG. 1 a tank-like flotation cell 10 containing waste waters having suspended solids therein, such as colloidal sewage particles or suspended particle solids from chemical or other waste treatment plants, to be removed from the water for providing an effluent which meets environmental standards. An influent line 12 and effluent line 14 provide for flow of liquid through the cell. Water is withdrawn through line 16 from the cell by recycle pump 18 which also is equipped with an inlet for receiving air through line 20 from a source of air supply. The air-water mixture is then discharged under a pressure of about 40–60 psi through line 22 to housing 24 containing an electrode 26 of aluminum, iron or any other metal which desirably will release trivalent ions to the air-water mixture circulated therethrough.

To permit sufficient time for air to become completely dissolved in the water, the detention time in housing 24 should be about 2–3 minutes. Simultaneously, the electrode gives up metallic ions to the liquid mixture. Thereafter, the mixture is supplied through an expansion valve 28 which reduces the 40–60 psi pressure to about 2–3 psi prior to being discharged into cell 10. Upon entry into the cell, the reduced pressure of water mixture permits the release of many small bubbles of air which were dissolved in the water during its retention time in electrode housing 24. The amount of bubbles is so great that the water assumes a milky appearance.

Since the metallic ions are charged electro-positive and colloid sewage particles in cell 10 are electrode-negative, a great attraction between the ions and particles exist in the liquid with the result that a multitude of colloidal particles are combined to form a more concentrated mass of solids which is characterized as floc. The function of the minute air bubbles is to carry the floc to the liquid surface. As the floc is being formed, the bubbles adhere to the floc surfaces and impart buoyancy characteristics to it and thus carry in to the liquid surface. It will be understood that flotation cells used in municipal sewage plants for example are of very large size and the floc skimmers (not shown) move across the cell surfaces to remove the floc for disposal elsewhere.

Figure 2:
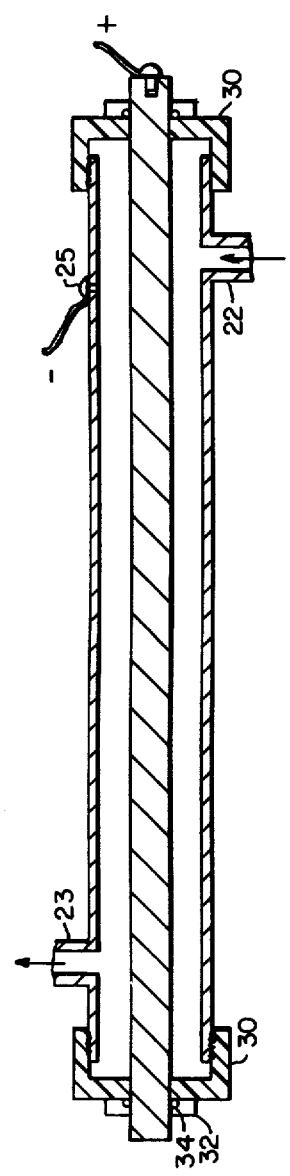
FIG. 2 is a view in elevation, partly in section, illustrating the arrangement of an electrode in a housing.

FIG. 2 illustrates the design of the external electrode which adds metal ions and bubbles to the liquid. As shown, the housing 24 comprises a stainless steel electrode of cylindrical configuration. The stainless steel housing or shell 24 comprises the electrode cathode having a terminal 25 and an anode 26 extends axially along the housing length. A power supply 27, FIG. 1, supplies current to the anode-cathode circuit. Caps 30 disposed on opposite ends of the housing contain central openings which support anode 26 and screw-type covers 32 and O-ring seals 34 both insulate the anode and cathode from each other and preclude leakage from the housing. Inlet 36 and outlet 38 provide for circulation through the housing.

Since the anode is disposed in housing 24 and therefore not available for visual inspection, its degree of consumption can be determined by periodically recording the resistance of the anode bar 26. Desirably, the current density per unit area of anode should be kept relatively low to prevent chemical erosion of the anode bar. Current flow therefore should be about 0.5 amperes per square foot of anode bar material. Irregular surfaces, such as a star shaped anode helps keep the current density in a low acceptable range. It also assists in minimizing scale deposit on the bar material.

It will be apparent that the housing in normal situations can be located within a second larger container arranged to accommodate more than one electrode. Also, since the electrode will generate bubbles by electrolysis, such bubbles supplement those provided by recycle pump 18 although its main function is to supply metallic ions to the liquid being treated. When the electrodes are used in large size plants, the external electrodes may be stacked in a bank alongside the flotation cell. With proper and appropriate valving, the anode bars can be changed without shutting down the cell thus permitting uninterrupted operation of the system.

In view of the above, it is apparent that many modifications and variations may be made in light of the above teachings. It therefore is to be understood that within the scope of the appended claims, the invention may be practiced other than as specifically described.

I claim:

1. A process for removing particulate suspended matter from a liquid in a flotation cell comprising the steps of:
    utilizing a pump to withdraw liquid from said cell and introducing air into the pump to form a liquid-air mixture;
    supplying the pressurized mixture of air and liquid to an energized electrode positioned in a housing located exteriorly of a flotation cell;
    supplementing the supply of air in said mixture with bubbles electrolytically generated by said electrode;
    allowing the mixture to remain in contact with the electrode for a time sufficient to permit the air to be dissolved in said liquid and for the electrode to impart metal ions to the liquid;
    discharging the mixture from said housing through an expansion valve to reduce the pressure thereof and then delivering the reduced pressurized mixture to said flotation cell wherein the air comes out of solution in the form of small bubbles;
    utilizing the electric charges on said ions to cause colloidal particulate matter to form a loosely assembled concentrated mass of solids; and
    utilizing the buoyant characteristics of the air bubbles to combine with the solids to carry the solids to the surface in the form of floc.

2. Apparatus for removing suspended particulate matter from liquid in a waste water treatment system comprising:
    a flotation cell having an inlet and outlet through which a liquid containing solid particulate matter is adapted to be circulated;
    a pump connected with said cell for withdrawing liquid therefrom, and an air inlet on said pump for introducing air into the liquid to form an air-liquid mixture;
    ion generation means having an inlet connected to the discharge side of said pump, said ion generation means comprising a housing enclosing a metallic electrode;
    means insulating and spacing said electrode from the housing walls thereby providing a chamber through which said air-liquid mixture is circulated under a pressure;
    said electrode being capable of forming trivalent ions and imparting small air bubbles to said air-liquid mixture as it flows through the chamber;
    an expansion valve connected between the chamber outlet and said flotation cell which reduces the pressure of said mixture flowing therethrough, thereby permitting small air bubbles to come out of the air-liquid mixture upon its entry into the flotation cell, the arrangement being such that as the ions provided by said ion generation means contacts the particulate matter in the flotation cell, floc is formed which is then carried to the liquid surface by the air bubbles as they rise from the bottom of the cell to the top thereof.

* * * * *